United States Patent [19]
Fields et al.

[11] Patent Number: 5,554,335
[45] Date of Patent: Sep. 10, 1996

[54] PROCESS FOR ENGRAVING CERAMIC SURFACES USING LOCAL LASER VITRIFICATION

[75] Inventors: William C. Fields, Hermann; Dan Fredrick, Ballwin; Steve Grannemann; Phyllis Hannan, both of Hermann; Igor Lukashevsky, St. Louis, all of Mo.

[73] Assignee: Laser Light Technologies, Inc., Hermann, Mo.

[21] Appl. No.: 392,046

[22] Filed: Feb. 22, 1995

[51] Int. Cl.$^6$ .................................................. B23K 26/16
[52] U.S. Cl. ...................... 264/400; 219/121.66; 264/434
[58] Field of Search ...................... 264/400, 434, 264/482; 430/346, 945; 219/121.65, 121.66, 121.68, 121.69

[56] References Cited

U.S. PATENT DOCUMENTS

| | | | |
|---|---|---|---|
| 4,476,310 | 9/1988 | Gugger et al. | 430/945 |
| 4,997,468 | 3/1991 | Dimitrov et al. | 219/121.68 |
| 5,030,551 | 7/1991 | Herren et al. | 430/945 |
| 5,198,637 | 3/1993 | Noda et al. | 219/121.66 |
| 5,298,717 | 3/1994 | DeRossett, Jr. | 219/121.68 |
| 5,397,686 | 3/1995 | Dominick et al. | 430/945 |
| 5,473,138 | 12/1995 | Singh et al. | 219/121.68 |

FOREIGN PATENT DOCUMENTS

| | | | |
|---|---|---|---|
| 369057 | 5/1990 | European Pat. Off. | 219/121.65 |
| 59-8676 | 1/1984 | Japan | 219/121.65 |

OTHER PUBLICATIONS

"Low Pressure Pulsed $CO_2$ Laser and Its Use For Scribing Pyroceramic Plates", Vol'ter +Sviridov, Soviet Journal of Optical Technology, 45(6), Jun. 1978, p. 376+378.

*Primary Examiner*—Mathieu D. Vargot
*Attorney, Agent, or Firm*—Robbins & Robbins

[57] ABSTRACT

A process is provided for producing contrasting, long lasting, glassy heat fused images on the surface of ceramic materials such as bricks using a laser to vitrify the substrate material. The process is accomplished in three stages: Stage 1) the laser produces a non-adherent, highly light absorptive layer by heating and removing material from the marking field to create depth into the brick's surface; Stage 2) melting of the main portion of the substrate material along the marking field using the non-adherent light absorptive layer from Stage 1 as an effective light absorber/heat transducer to cause vitrification along the marking field; Stage 3) residue from the melting in stage 2 is removed by laser ablation to produce the vitrified finished mark.

8 Claims, 5 Drawing Sheets

PROCESS FOR ENGRAVING CERAMIC SURFACES USING LOCAL LASER VITRIFICATION

BACKGROUND OF THE INVENTION

There are many well known methods of engraving or producing images on a brick surface or other unglazed ceramic material, such as painting, molding, sand blasting, mechanical grinding, and chemical etching. All of them have one or more disadvantages: 1.) they involve hazardous or harmful materials and/or by-products in that they use highly aggressive chemicals, produce environmental pollution such as dust, or produce a high level of sound while creating the images; 2.) they leave poorly produced images that do not have contrast because they only remove brick material in making patterns in the brick's surface without following up with contrasting shades or colors; 3.) their processes are slower and inefficient, and require permanent and expensive tools for grinding and blasting, or special buildings and chambers with pollution collectors for chemical treatment; 4.) the resultant images are not long lasting because the mechanical processes make internal micro cracks and chips in the brick which contribute to long-term deterioration of the brick material, and the chemical processes result in penetration of the chemical into the porous brick material causing continuous chemical reaction long after the mark is created.

There is accordingly a need for a process for marking and engraving brick or other like ceramic material which can produce a distinctive, long lasting image in a manner that is efficient, safe, and environmentally sound.

SUMMARY OF THE INVENTION

By means of this invention there is provided a process for engraving ceramic surfaces, such as bricks, using lasers. The heating effect of the laser causes vitrification of the material of the brick to produce a contrasting, long lasting, glassy heat fused image in and below the surface of the brick. This occurs in three stages:

Stage 1) The laser beam is introduced to and delivers energy to the brick surface along the marking field of the desired image and produces a depth effect by removing material while creating a non-adherent, highly light absorptive layer of heated residue.

Stage 2) As the laser beam continuously delivers energy, there is melting of the main portion of the brick material using intense heat to vitrify the material in the marking field.

Stage 3) By slightly removing the residue at the top of the molten layer and any vaporization created in Stage 2 the laser produces a vitrified finish mark.

It is therefore an object of this invention to provide a process for marking ceramic objects, such as clay bricks, using a laser to create a highly adherent, glassy contrasting image along the marking field of the brick surface.

It is further an object of this invention to produce an engraving in the surface of a ceramic object that can withstand environmental, chemical and aging effects and can maintain its configurational integrity.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

The process of this invention produces a glassy, contrasting image on and in the surface of ceramic materials by vitrification, as a result of melting by laser. Although this process works on many types of ceramic materials, it works best on red clay bricks, presumably because of their high silica content. Vitrification is the conversion of a material into a glass or glass-like substance. Glass is a fused mixture of silicates and other materials.

A standard industrial laser may be used, such as the Baasel Lasertech 6000, 60 watt, Nd. Yag. An appropriate lens, such as a 160 mm Rodenstock lens, is used to produce a diametral laser beam. The laser peak power should be sufficient to melt brick material. The laser equipment and control of the direction and intensity of the laser beam are controlled by software well known to those skilled in the art. There exist software programs to give the laser marking capabilities, including various font options, on a wide variety of subject materials. These programs themselves do not form part of the invention per se.

Figure 1:
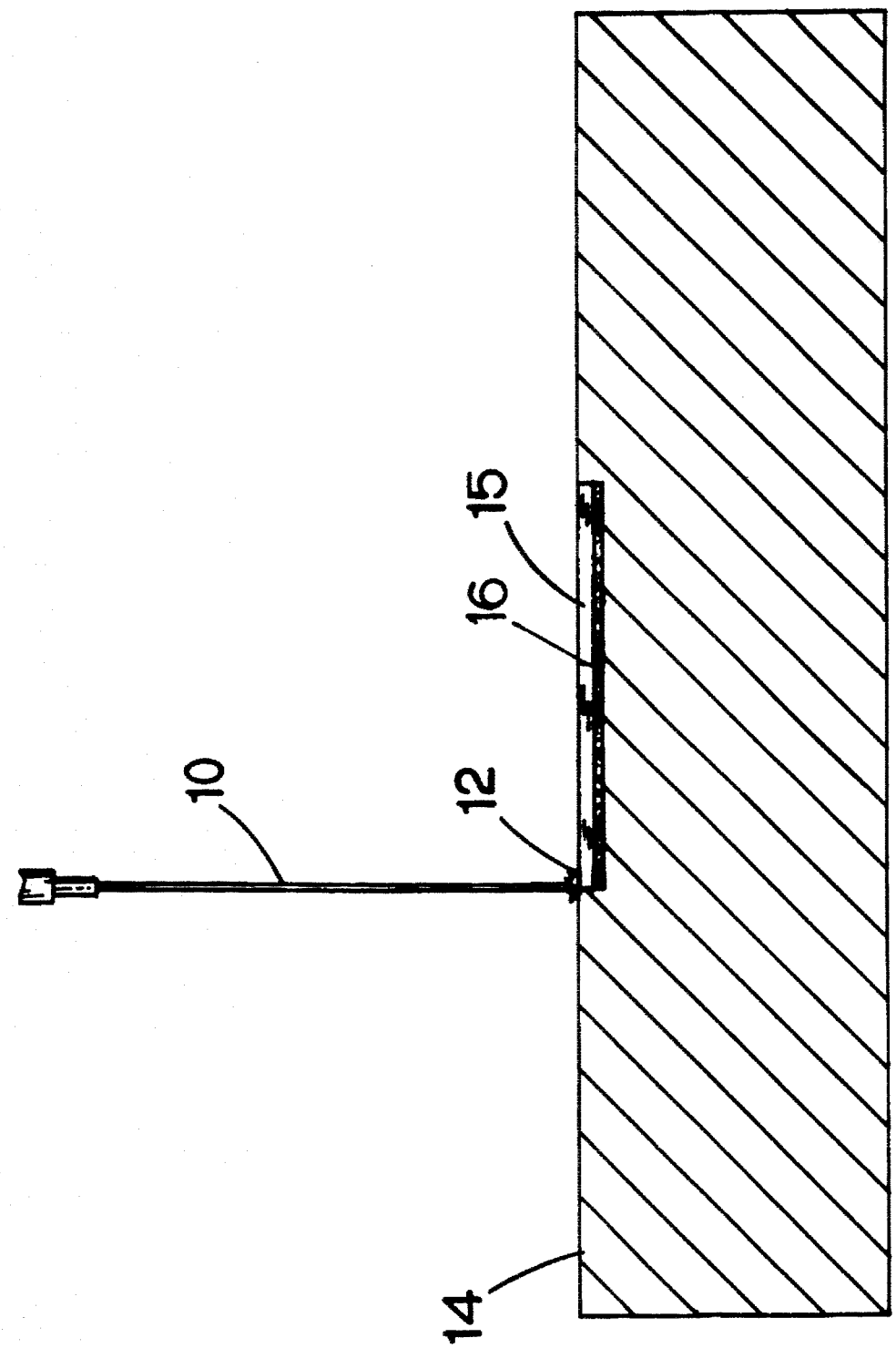
FIG. 1 is a schematic cross section view of the first stage of the inventive process showing the laser beam delivering high amounts of energy to the brick surface to be marked to create a depth effect and a non-adherent, highly light absorptive layer.

Referring to FIG. 1 depicting the first stage schematically, laser beam 10 delivers energy to the region of the image 12 to be engraved on brick 14. The porous brick material is removed by ablation in this region to create a depth effect 15 while a non-adherent, highly light absorptive layer 16 is produced from the friction and vaporization effects of heating the brick material. This layer is comprised of a fine stratum of residue and ash particles produced by heating the material. This enhances the further heating effect to a greater extent than that available from the laser beam impinging only on the unheated brick material itself. The brick material is normally light reflective and thus difficult to melt initially. The depth 15 attained should be at least 0.001 inch below the brick exterior surface.

Figure 2:
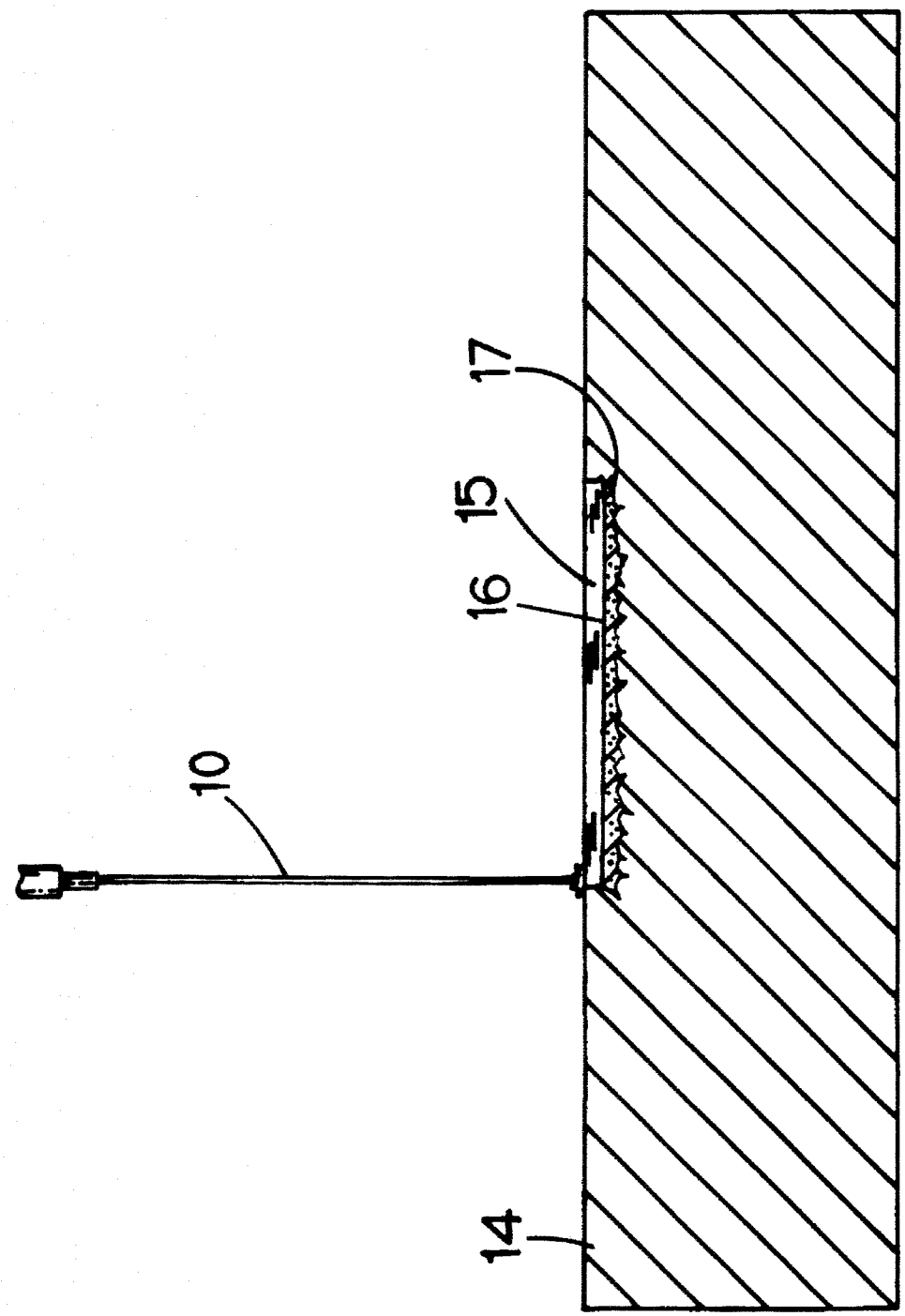
FIG. 2 is a schematic cross section view of the second stage of the inventive process showing the laser beam continuing delivering heat energy to the brick surface to cause vitrification along the marking field.
Figure 4:
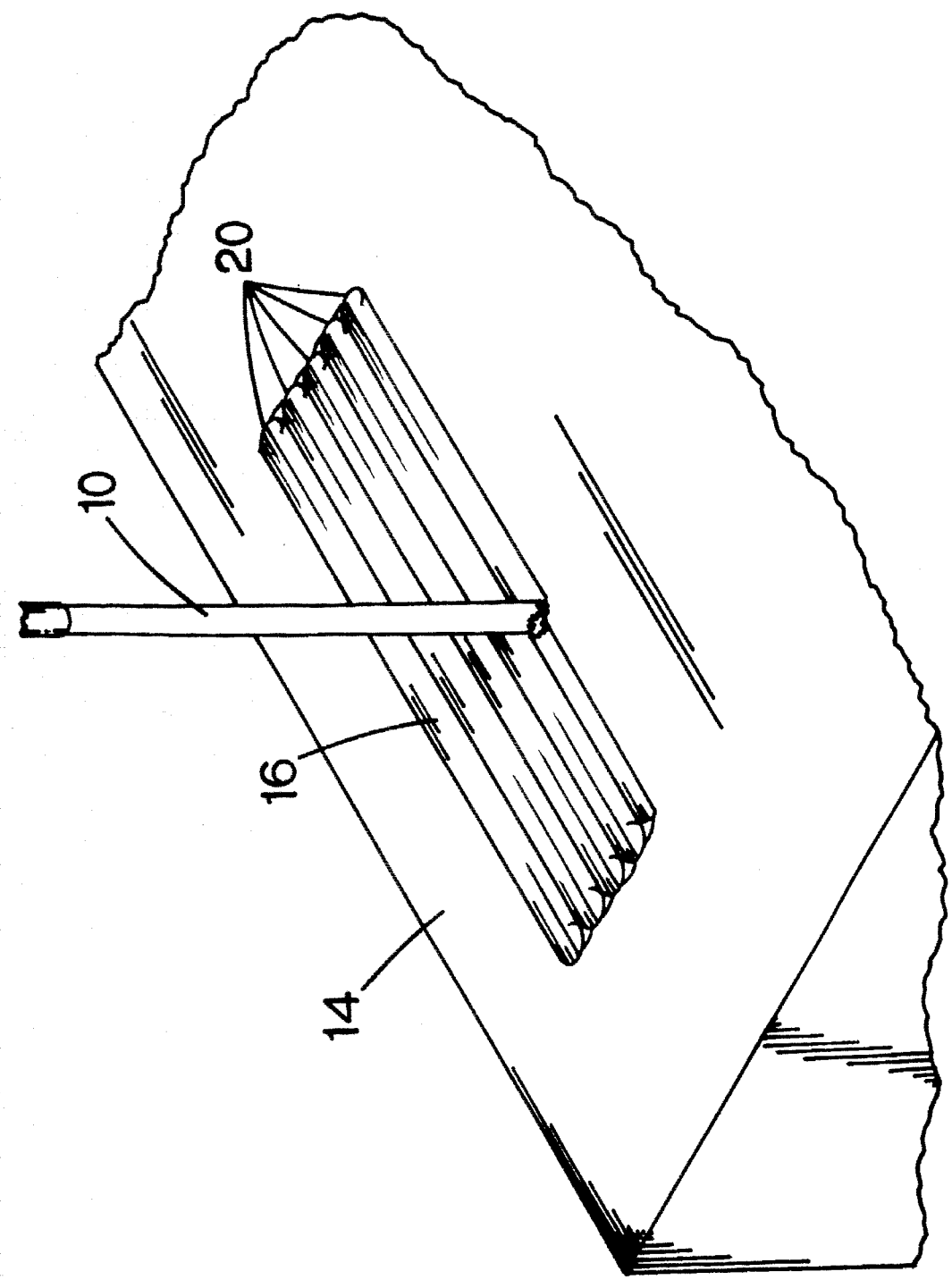
FIG. 4 is a schematic view of the laser hatching effect.

In FIG. 2 depicting the second stage schematically, laser beam 10 continues to deliver energy, creating a bath of melted material 17. The effectiveness of the laser vitrification is highest at this point because of the increased light absorption of the molten layer. The beam travels over the engraved image in a hatching effect. The laser hatching, shown schematically in FIG. 4, is carried out by programming the laser to direct bursts of light beams in passes of parallel orientation. Each subsequent adjacent beam pass 20 thus overlies a prior pass by one half (½) of the diameter of the beam. For instance, with a laser beam diameter of 0.004 inches, a subsequent adjacent laser beam pass would be spaced 0.002 inches from the starting point of the prior laser pass. Therefore, where the laser beam has a diameter (D), the distance (d) between the center lines of any two beam passes is d=D/2. This provides better heating effectiveness than cross hatching because more laser beam overlap occurs. The described hatching also contributes to the contrasting shade of the engraved image and usually leaves a black coloration. It is in this stage that the vitrified material fuses to the underlying brick surface along the marking field.

Figure 3:
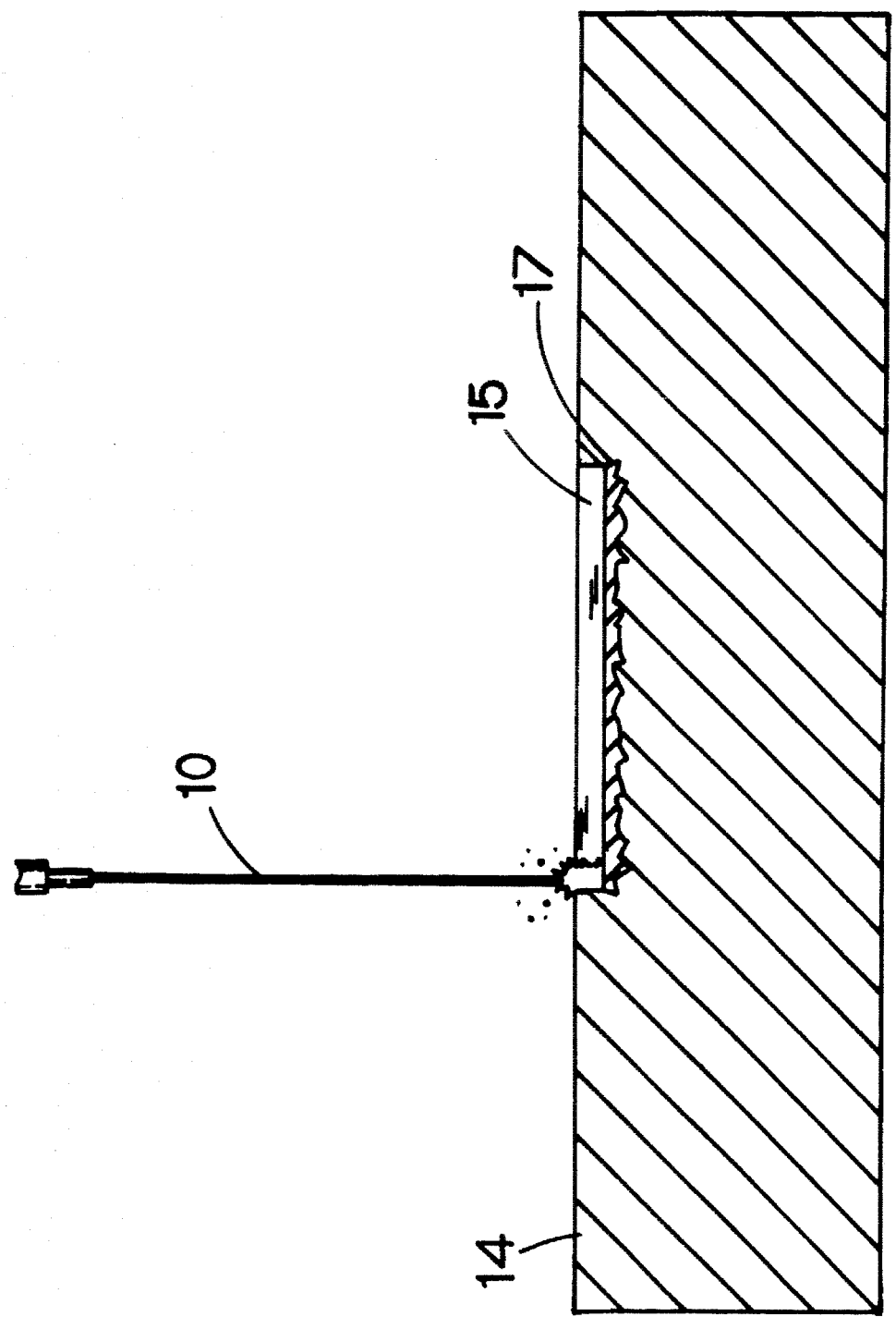
FIG. 3 is a schematic cross section view of the third stage finishing effect of the inventive process.

In FIG. 3 depicting the third stage schematically, the laser beam 10 slightly removes the top portion of the molten layer 17 by ablation. This provides a highly adherent, glassy contrasting finished image in the surface of the brick. Because the laser is precise, the resulting engravement has much more stability and mechanical strength than one produced as a result of breaking or chipping away the surrounding material. The glassy quality produced by the laser vitrification further adds stability, much like glazing. The depth effect is important in that it establishes the vitrified surface of the mark below the exterior surface of the brick thus helping to avoid the directly immediate exposure to abrasive environmental factors. A mark having no depth and lying substantially on the exterior surface of the brick is more susceptible to those abrasive environmental factors and would be more readily worn away by direct contact with such elements.

Figure 5:
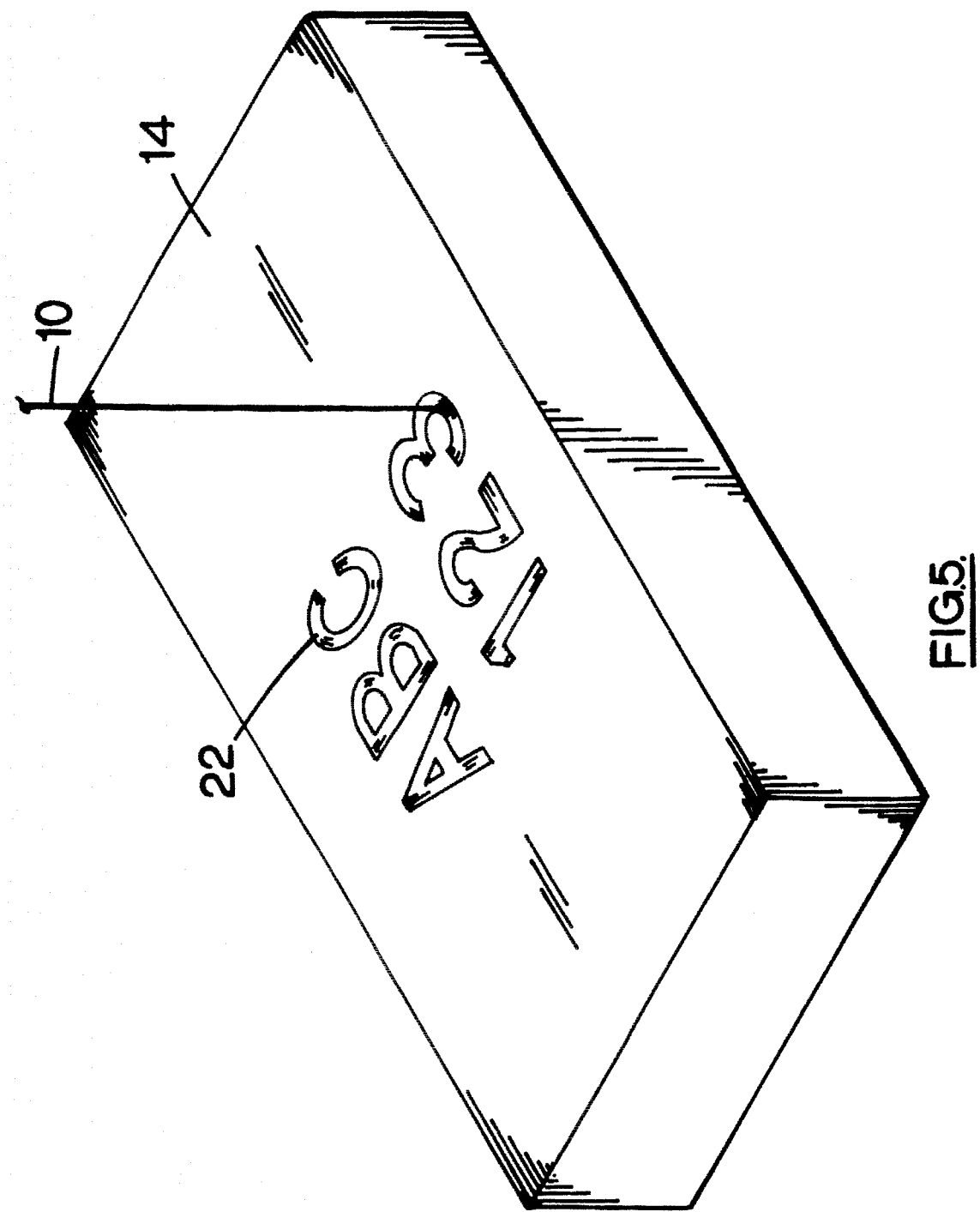
FIG. 5 is a perspective view of a typical brick engraved by the inventive process.

FIG. 5 shows a typical engraved brick end-product produced by the inventive process. Various font styles 22 can be used and are conventionally programmed into the laser to control the beam as is well known in the art. Thus, a wide variety of script styles are commercially available or can be produced to create different engraved appearances.

USE

A preferred mode of carrying out the inventive process as contemplated by the inventors is as follows. A red clay paving brick having a relatively smooth surface is selected for marking. An appropriate lens, such as a 160 mm Rodenstock, is used in the laser head to produce an appropriate beam diameter, for example around 0.003 to 0.004 inches. Laser peak power should be sufficient to vaporize and melt the brick material.

The laser should make one cutting pass over the marking area with a relatively low beam frequency (q-switch rate) to create a "depth" effect, and should be followed by a second laser pass with a greatly increased beam frequency (q-switch rate) to vitrify the material. A third pass with a reduced beam frequency (q-switch rate) is made to create the finish effect.

The laser beam in the first pass should have a beam frequency, galvo speed, and lamp current that will remove the material to the required depth. For example, the beam frequency should be around 4000 beam pulses/second (Q-switch rate of Q4000), the galvo speed or writing speed should be around GO50 so that the laser marks at a rate of around 50 mm per second, and the lamp current should be set at around 22.5 Amps (LS225). The laser hatching is effected by parallel overlapping laser beam passes. This creates the most effective and efficient heating results for satisfactory vitrification.

In the second pass, the laser beam frequency and galvo speed are increased significantly, while the lamp current remains the same. For example, the laser beam frequency should be around 32,000 beam pulses/second (Q32000), and the galvo speed should be around GO100 (100 mm per second). This pass causes the majority of melted and subsequently vitrified material to develop.

In the third pass the laser beam frequency and lamp current are decreased, and the galvo speed is increased. For example, the laser beam frequency should be around 6,000 beam pulses/second (Q6000), and the galvo speed should be around GO350 (350 mm per second). Additionally, the lamp current would be optimally set at around 15 Amps (LS 150). This pass removes any surface deposits and exposes the glassy black appearance of the mark.

Various changes and modifications may be made within this invention as will be apparent to those skilled in the art. Such changes and modifications are within the scope and teaching of this invention as defined in the claims appended hereto.

What is claimed is:

1. A process for engraving ceramic surfaces using a laser, said process comprising applying said laser to said ceramic surface along an area to be engraved such that a portion of said ceramic material in said engraving area is removed and melted by said laser to a sufficient degree such that said melted material is fused into a surrounding unmelted portion of said ceramic material whereby an adherent, contrasting marking is created along said engraving area to a depth within and below said ceramic surface, said engraving taking place in three stages:

a first stage in which said laser removes a portion of said ceramic material to form said depth for said marking within and below said ceramic surface;

a second stage in which said laser continues to deliver energy to melt and vitrify said ceramic material whereby it is fused into surrounding unmelted ceramic material within said depth; and a third stage in which said laser removes residue from said ceramic surface to effect said adherent, contrasting marking.

2. The process of claim 1 in which said laser hatches over said engraving area, said laser being programmed to direct light beams in hatching passes of parallel orientation, each subsequent adjacent beam pass overlapping a prior pass by one half of a diameter of said beam, whereby a heating efficiency is enhanced.

3. The process of claim 1 in which in said first stage a non-adherent, highly light adsorptive layer is created upon removal of said portion of said ceramic material, whereby an increased heating efficiency in said second stage is effected.

4. The process of claim 3 in which said non-adherent, highly light adsorptive layer is comprised of a fine stratum of residue and ash particles produced by heating said ceramic material.

5. The process of claim 1 in which in said first stage, said laser is set to pulse 4,000 times per second with a writing speed of 50 mm per second.

6. The process of claim 1 in which in said second stage, said laser is set to pulse 32,000 times per second with a writing speed of 100 mm per second.

7. The process of claim 1 in which in said third stage, said laser is set to pulse 6,000 times per second with a writing speed of 350 mm per second.

8. The process of claim 1 wherein in said first stage, said laser is set to pulse 4,000 times per second with a writing speed of 50 mm per second; in said second stage, said laser is set to pulse 32,000 times per second with a writing speed of 100 mm per second; and in said third stage, said laser is set to pulse 6,000 times per second with a writing speed of 350 mm per second.

* * * * *